G. S. BOUCHER.
EDGER SAW SETTING MECHANISM.
APPLICATION FILED FEB. 15, 1912.
1,056,252.
Patented Mar. 18, 1913.
3 SHEETS—SHEET 1.
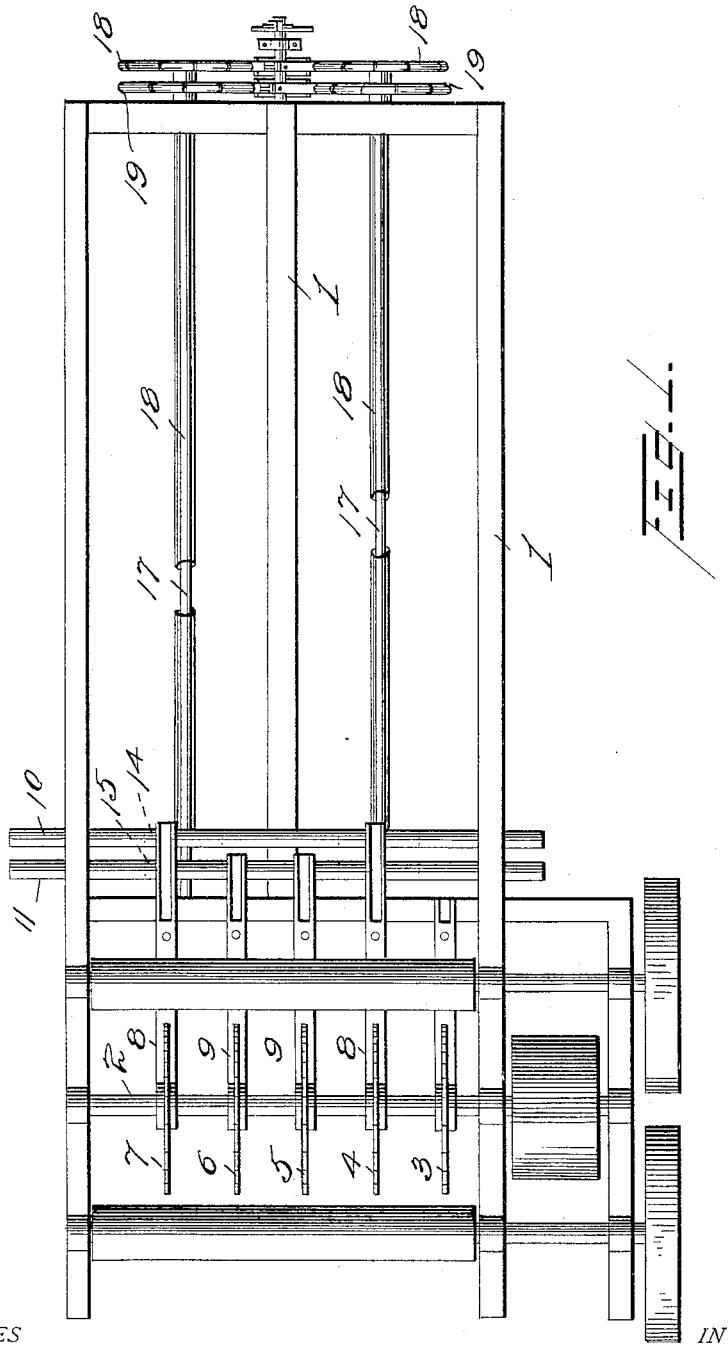
WITNESSES
INVENTOR:
George S. Boucher,
Attorney

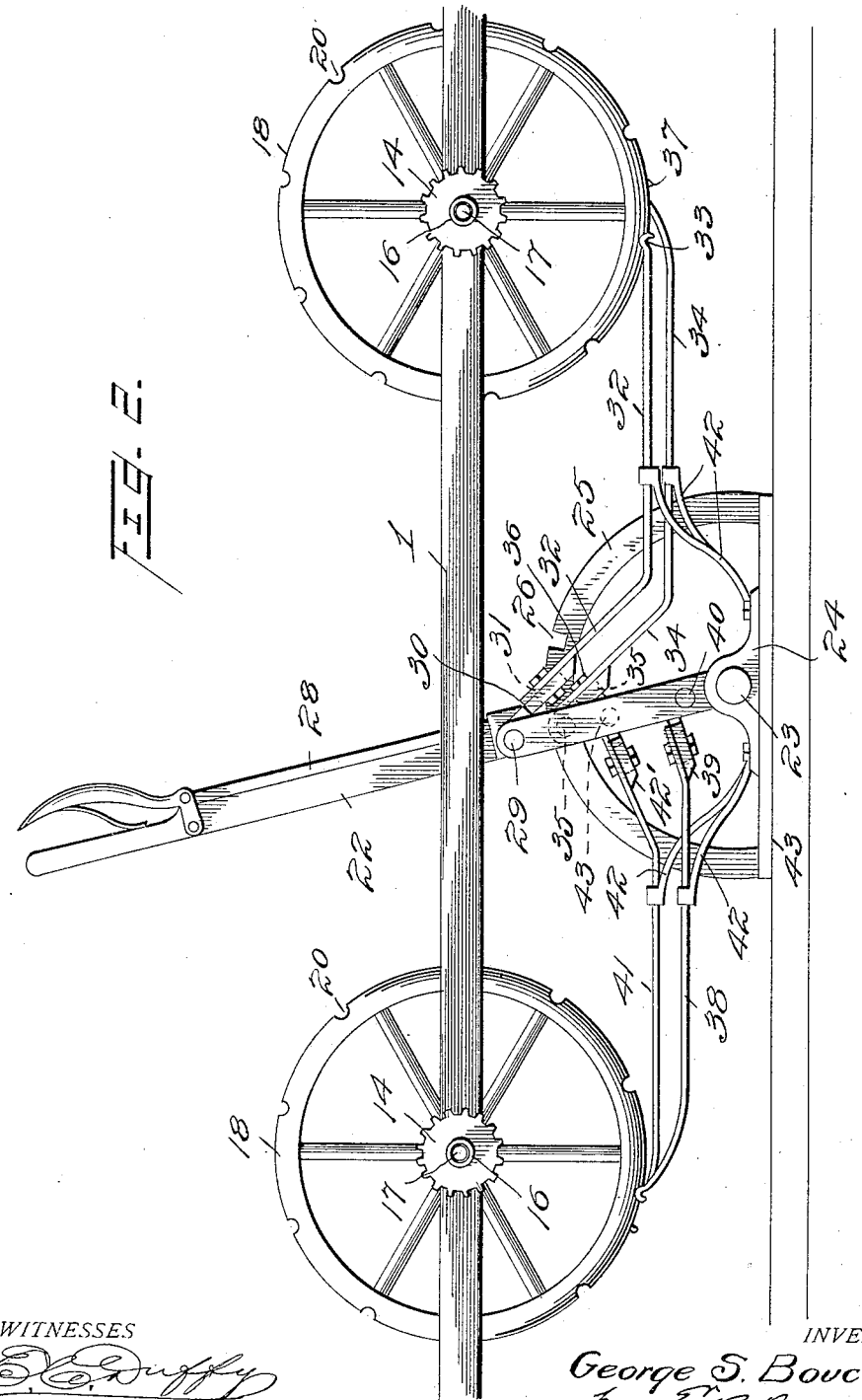

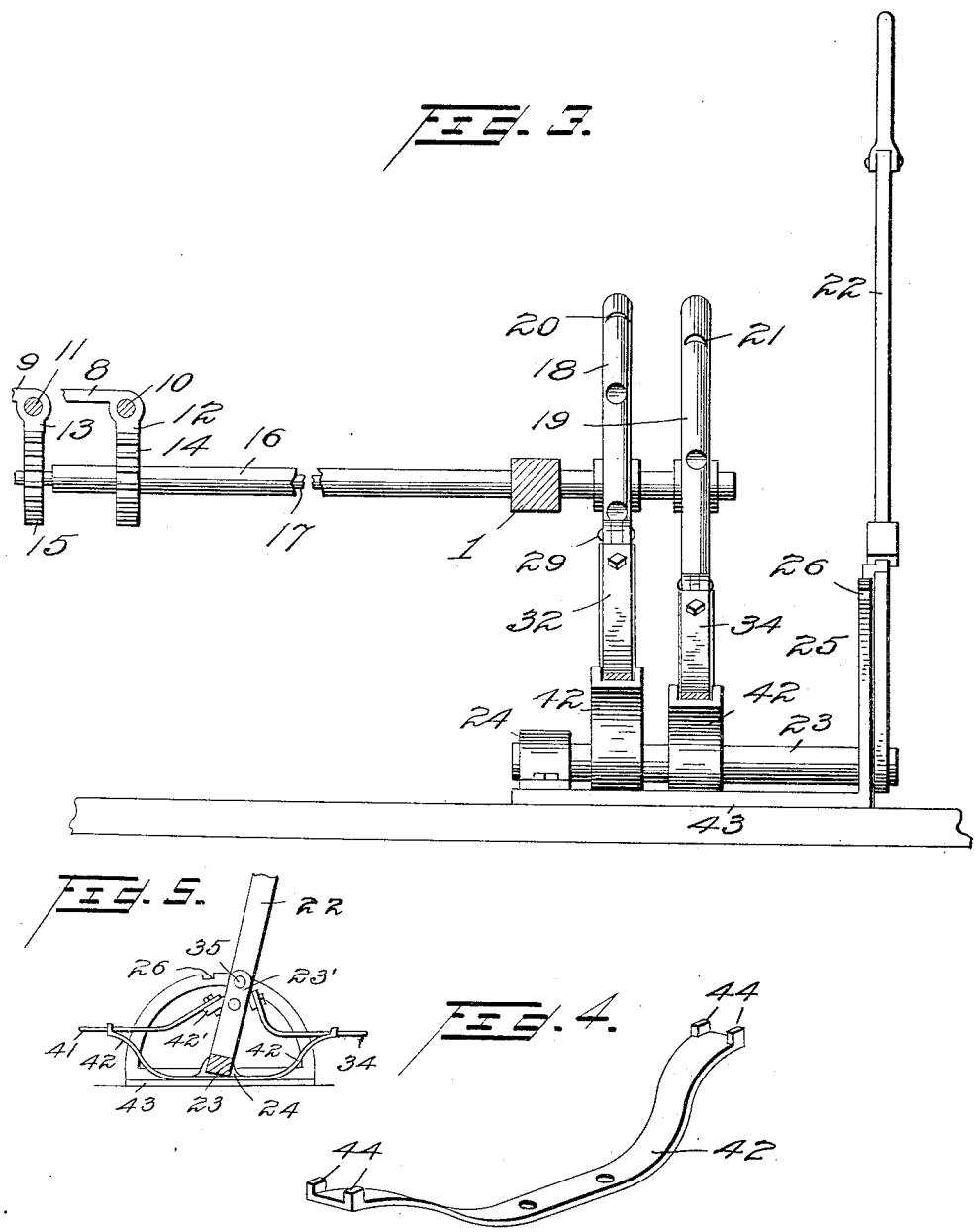

UNITED STATES PATENT OFFICE.

GEORGE S. BOUCHER, OF DAMASCUS, VIRGINIA.

EDGER-SAW-SETTING MECHANISM.

1,056,252.  Specification of Letters Patent.  Patented Mar. 18, 1913.

Application filed February 15, 1912. Serial No. 677,687.

*To all whom it may concern:*

Be it known that I, GEORGE S. BOUCHER, a citizen of the United States of America, residing at Damascus, in the county of Washington and State of Virginia, have invented certain new and useful Improvements in Edger-Saw-Setting Mechanism, of which the following is a specification.

This invention relates to edger saw setting mechanism designed to be used on gang edgers and one of the principal objects of the invention is to provide simple, reliable and efficient means for shifting the saws quickly to saw lumber of different widths and to provide means whereby the saws may be readily set or adjusted for allowing shrinking of the lumber in drying.

Another object of the invention is to provide simple and reliable means for shifting and adjusting the saws of a gang edger to allow one-quarter inch in each piece of lumber sawed for shrinkage, said means comprising shifting wheels and a lever adapted to be shifted in two positions to set the saws for even inches or to allow the quarter inch for shrinkage.

These and other objects may be attained by means of the construction illustrated in the accompanying drawings, in which;

Figure 1 is a top plan view of a portion of a four saw edger showing my saw shifting mechanism connected thereto; Fig. 2 is a view in elevation on a larger scale of the shifting mechanism looking from the inner ends of the shifting shafts; Fig. 3 is a sectional view showing one of the pairs of shifting wheels, the pinions carried by the hollow and solid shaft, and the rack bars for shifting the saws, the hollow and solid shaft being broken away near the center thereof; Fig. 4 is a perspective view of the spring guide for the spring shifting dogs. Fig. 5 is a sectional view taken on the line 5—5 of Fig. 3, looking in the direction indicated by the arrow.

Referring to the drawings, the numeral 1 designates portions of the edger frame for the gang edger, 2 is the saw arbor, 3 is the stationary saw and 4, 5, 6 and 7 are the movable saws mounted to slide on the saw arbor 2 and to rotate therewith. The saws are mounted on the arbor 2 between brackets 8 and 9 which extend toward the front of the machine and are mounted to slide upon supporting rods 10 and 11 extending across the frame of the machine. Formed on the under side of the brackets 8 and 9 are rack bars 12 and 13, Fig. 3, which are engaged by pinions 14 and 15. The pinion 14 is mounted on the hollow shifting shaft 16, while the pinion 15 is keyed to the solid shaft 17 which extends through the hollow shaft 16, as shown more clearly in Fig. 3. Connected to the outer end of the solid shaft 17 is a shifting wheel 18 and fixed to the hollow shaft 16 is a shifting wheel 19. The shifting wheels 18 and 19 are each provided with a series of peripheral notches 20 and 21.

A lever 22 is rigidly connected to a shaft 23, journaled at one end in a bearing 24, while the opposite end of said shaft extends through and is journaled in a sector rack 25, provided with two spaced notches 26, for the engagement of the spring bolt 28 carried by the lever 22 and adapted to slide thereon, for projecting the end of said bolt into the notches 26. Spaced arms 23' are rigidly connected to the shaft 23, and between the arms 23', is an adjusting block 30, provided with a slot 31, for the adjustable attachment of a spring shifting dog 32, which extends outward and is provided with a bent end 33, adapted to engage any of the notches 20, in the shifting wheel 18. A shifting dog 34, is connected to an adjusting block 35, provided with a slot for the bolt 36, said shifting dog being provided with a bent end 37, adapted to engage any of the notches 21 in the shifting wheel 19.

Extending from the opposite side of the arms 23' is a shifting dog 38, connected to an adjusting block 39, pivoted at 40 between the arms 23', and extending upon the same side of the arms is a spring shifting dog 41, connected to an adjusting block 42', pivoted at 43 between the arms 23'. The shifting dog 38 engages the notches 20 in the shifting wheel 18, while the dog 41 engages the notches 21 in the wheel 19. Spring guides 42 are secured to the base 43 of the sector 25, said guides each having spaced lugs 44, for guiding the dogs 32, 34, 38 and 41.

When the lever 22 is in one of the notches 26 as shown in Fig. 2 of the drawings, the saws, 4, 5, 6 and 7 are spaced apart for sawing timber in even inches 2 x 4; 2 x 6, etc. When the lever 22 is shifted to the other notch 26, the dogs 32 and 34 rotate the shifting wheels 18 and 19 to shift saw #7 one inch toward the right, saw #6 is shifted three quarters of an inch; while the dogs 38 and 41 rotate their wheels 18 and 19 to shift the saw #5 one-half inch toward the right and the saw #4 one quarter of an inch. The result of this shifting of the saws gives a one-quarter of an inch for shrinkage in each piece of lumber cut by the saws.

The shifting dogs 32 and 34 being connected to the arms 23' at points above the dogs 38 and 41, each shifting wheel is rotated more or less, since the movement of the arms 23' is greater at the pivotal points 29 and 35 than at 40 and 43. By means of the adjusting blocks, the spring shifting dogs may be adjusted to vary the position of the bent ends of the dogs relatively to the notches in the shifting wheels to shift the saws more or less as required.

My invention may be readily connected to any gang saw edger for shifting the saws to allow for shrinkage or for other purposes.

It will be obvious that any suitable means for mounting the saws to slide on the arbor may be resorted to and this portion of the machine forms no part of my present invention.

I claim:

1. A shifting mechanism for setting saws comprising a saw arbor, saws mounted to slide on said arbor and to rotate therewith, and means for adjusting the saws, said means comprising notched shifting wheels arranged in pairs, one of said wheels being connected to a hollow shaft and the other to a solid shaft extending through said hollow shaft, a lever, spring shifting dogs operated by said lever, said shifting dogs adapted to engage the shifting wheels for rotating them simultaneously a predetermined distance for moving the saws and holding them in their adjusted positions.

2. A shifting device for gang edger saws comprising a saw arbor, saws mounted to slide on said arbor and to rotate therewith, and means for adjusting the saws at predetermined distances apart, said means comprising hollow shafts, solid shafts within the hollow shafts, a shifting wheel connected to each of the hollow shafts, a shifting wheel connected to each of the solid shafts, a pinion connected to each of the hollow shafts, and a pinion connected to each of the solid shafts, rack bars formed on the brackets connected to the saws, a lever for moving the shifting wheels, and shifting dogs operated by said lever for rotating said shifting wheels.

3. A shifting device for gang edger saws comprising a lever, spring shifting dogs operated by said lever shifting wheels provided with notched peripheries to be engaged by said spring shifting dogs, and means between the shifting wheels and the saws for permitting the saws to be moved simultaneously with the moving of the shifting wheels.

In testimony whereof I affix my signature in presence of two witnesses.

GEORGE S. BOUCHER.

Witnesses:
S. P. BOUCHER,
J. O. MIDLAM.

---

Copies of this patent may be obtained for five cents each, by addressing the "Commissioner of Patents, Washington, D. C."